United States Patent [19]
Tamura et al.

[11] Patent Number: 5,078,191
[45] Date of Patent: Jan. 7, 1992

[54] OFF-THE-ROAD HEAVY DUTY PNEUMATIC RADIAL TIRES FOR DECREASING INNER RUBBER PEELING AND CRACKING IN THE VICINITY OF THE SHOULDER PORTION

[75] Inventors: Akira Tamura, Iruma; Masato Takenoya, Urawa, both of Japan

[73] Assignee: Bridgestone Corporation, Tokyo, Japan

[21] Appl. No.: 336,472

[22] Filed: Apr. 12, 1989

[30] Foreign Application Priority Data

Apr. 14, 1988 [JP] Japan ................................. 63-92798

[51] Int. Cl.⁵ ......................... B60C 3/04; B60C 9/02; B60C 9/28
[52] U.S. Cl. ................................ 152/454; 152/526; 152/538; 152/548
[58] Field of Search ............... 152/454, 538, 532, 526, 152/548

[56] References Cited

U.S. PATENT DOCUMENTS

| 3,735,791 | 5/1973 | McKissick et al. | 152/454 |
| 3,977,455 | 8/1976 | Swales et al. | 152/454 X |
| 4,481,994 | 11/1984 | Pommier | 152/454 |

FOREIGN PATENT DOCUMENTS

| 1680466 | 9/1971 | Fed. Rep. of Germany. |
| 7623041 | 11/1976 | Fed. Rep. of Germany. |
| 61-157403 | 7/1986 | Japan ........................ 152/454 |

*Primary Examiner*—Michael W. Ball
*Assistant Examiner*—Gregory J. Wilber
*Attorney, Agent, or Firm*—Sughrue, Mion, Zinn Macpeak & Seas

[57] ABSTRACT

An off-the-road heavy duty pneumatic radial tire comprises a carcass of radial structure and a belt superimposed about a crown portion of the carcass, wherein the carcass profile in a radial section at temporary self-posture state of mounting onto a rim has a concave form between two particular contact points with respect to a straight line in parallel to the rotational axis of the tire at both sides of the equator and main belt layers constituting the belt are arranged along the concave carcass profile between the above two contact points.

3 Claims, 9 Drawing Sheets

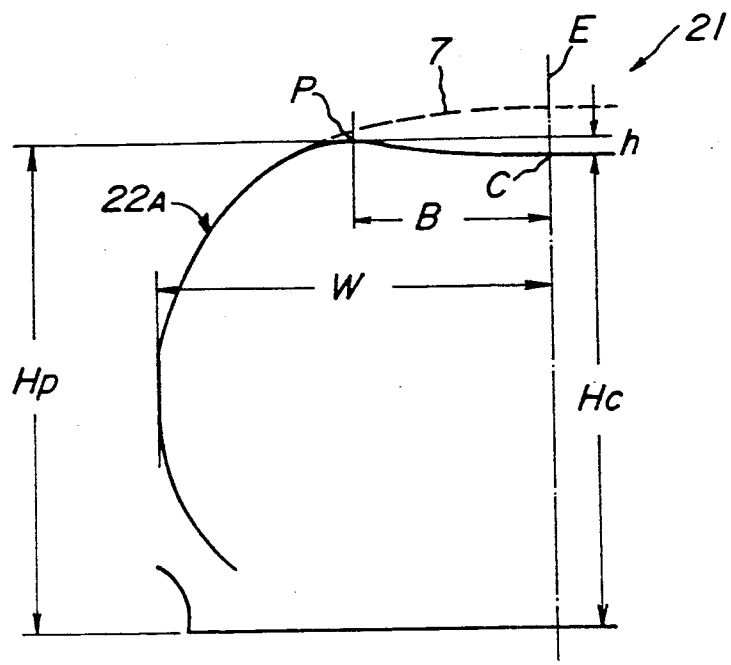
FIG_1
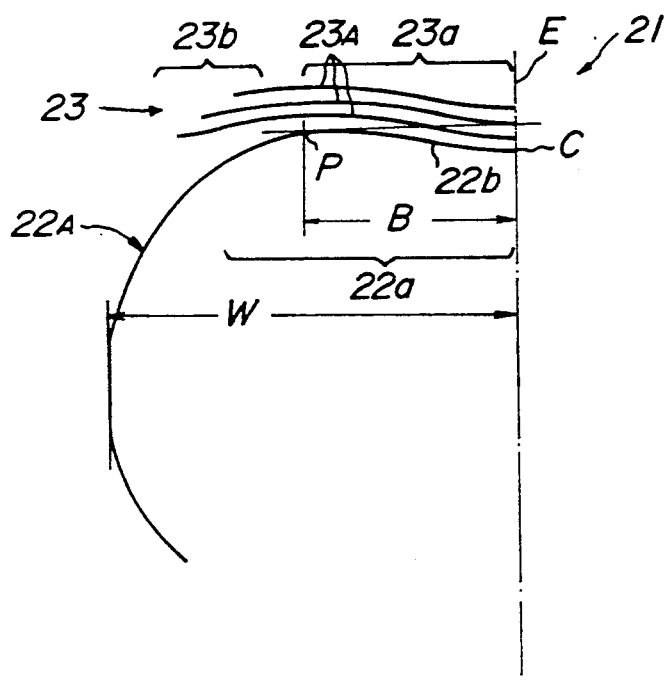
FIG_2

FIG_5a
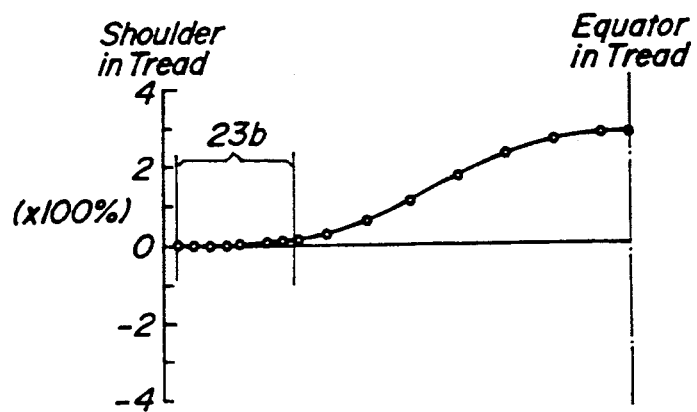
FIG_5b
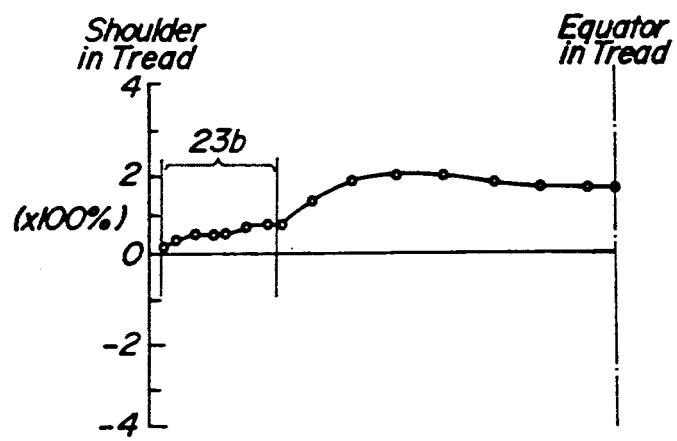

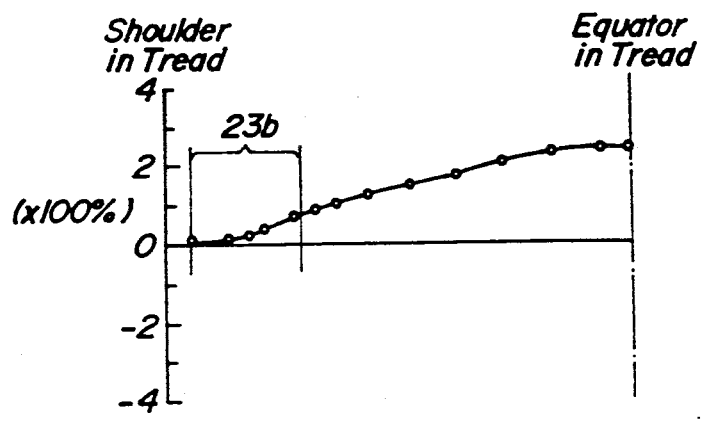
FIG_6a
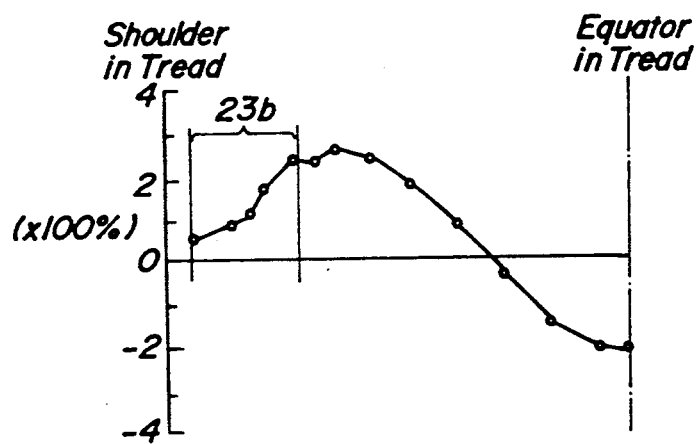
FIG_6b

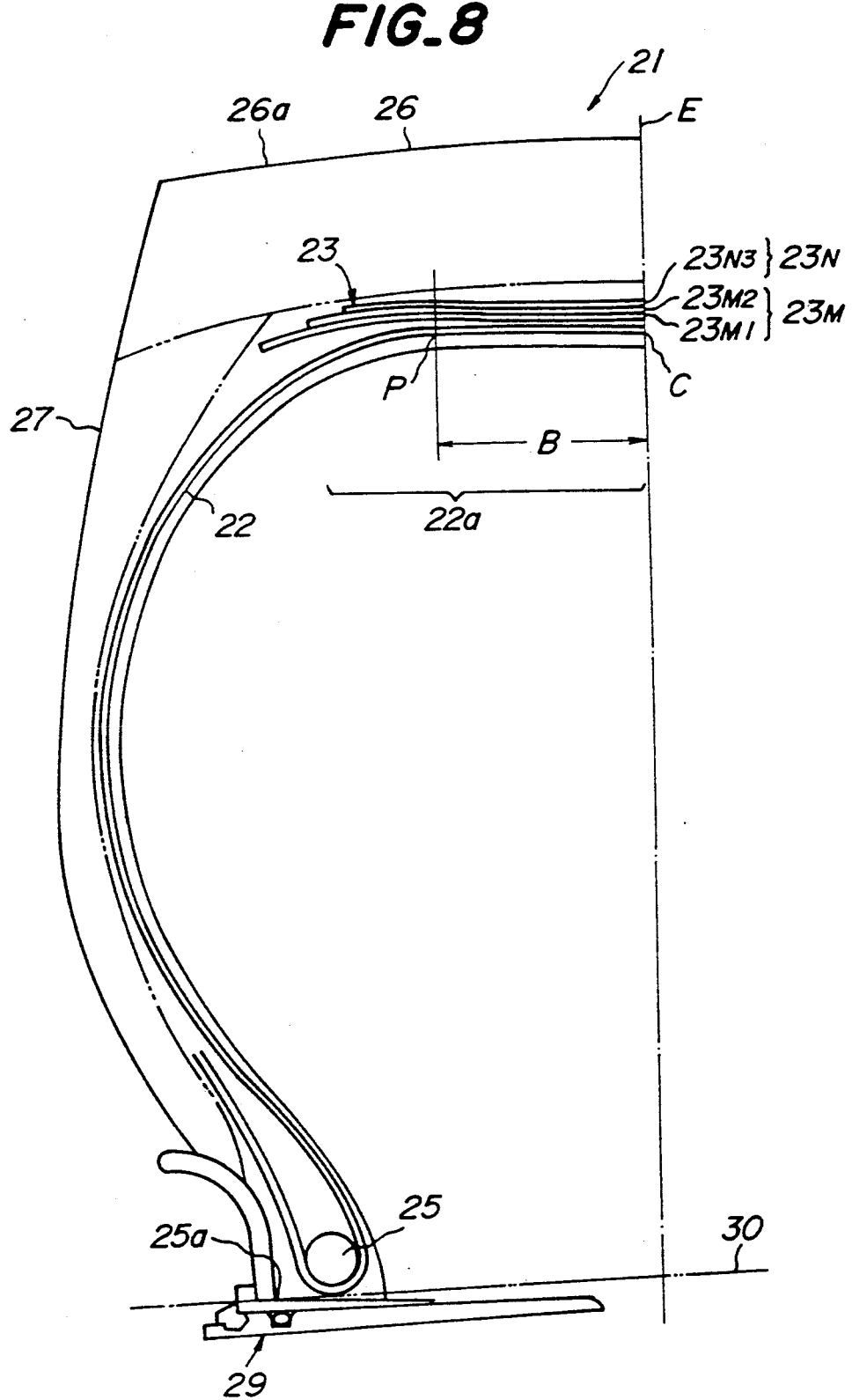

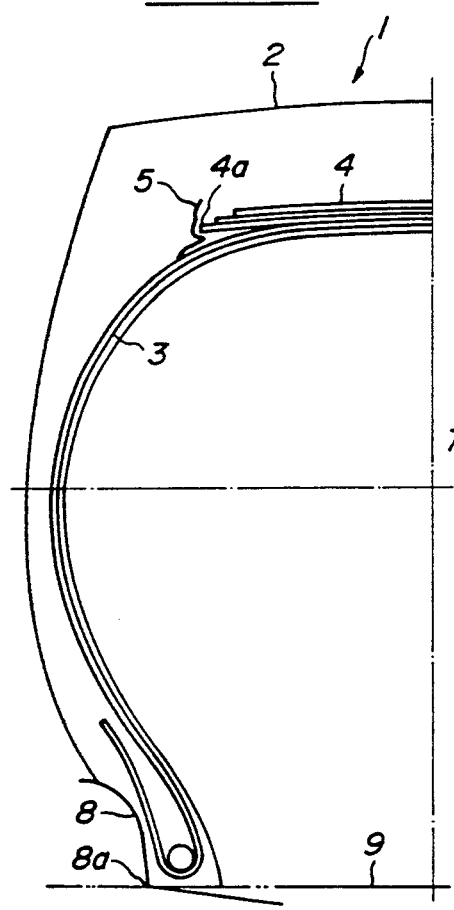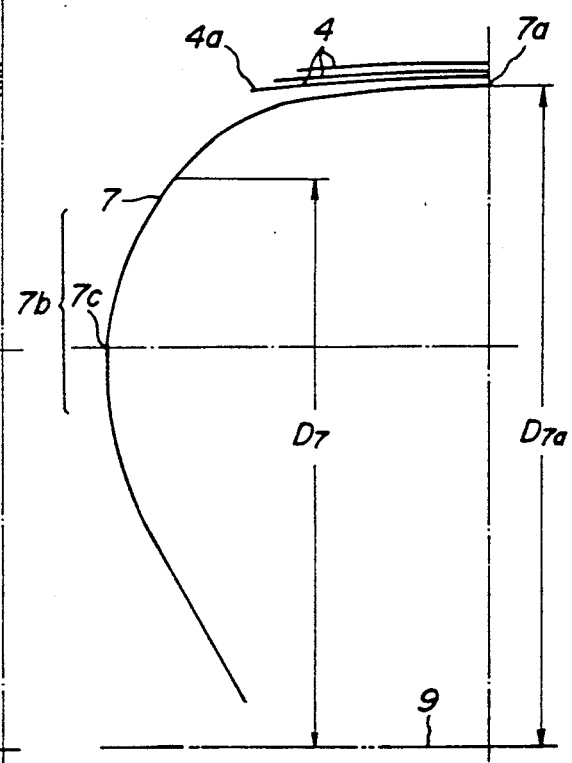
FIG_10a PRIOR ART
FIG_10b PRIOR ART

OFF-THE-ROAD HEAVY DUTY PNEUMATIC RADIAL TIRES FOR DECREASING INNER RUBBER PEELING AND CRACKING IN THE VICINITY OF THE SHOULDER PORTION

BACKGROUND OF THE INVENTION

1. Field of the Invention

This invention relates to an off-the-road heavy duty pneumatic radial tire for use in large vehicles running on irregular ground such as a building site, rough ground surface for transportation and work in mines or the like. More particularly it pertains to an off-the-road heavy duty pneumatic radial tire having an effective and appropriate means for mitigating the occurrence of inner rubber peeling and cracking in the vicinity of the shoulder portion of the tread.

2Related Art Statement

In general, the improvement of wear resistance, low heat build-up and low rolling resistance required in radial tires is attempted by arranging a belt having a high rigidity between the carcass and the tread in a radial tire.

However, since the rigidity of the belt is high, large size radial tires mainly running on rough road are high in the load bearing ratio at the same internal pressure even at standard or actual use states as compared with tires running on good road such as paved road or the like at a high speed. Such tires have many chances of being subjected to impact loading through unevenness on rough roads, so that excessive strain-stress are always applied to the belt in the vicinity of the free end of the belt. Consequently the peeling is caused at the end the belt to finally facilitate the occurrence of cracking.

That is, the carcass line of the radial tire is fundamentally an equilibrium shape so that a distance from a base line passing through a bead heel which is located from a rotational axis of the tire by ½ of nominal diameter of a rim mounting the tire and in parallel to the rotational axis of the tire is maximum at an equatorial plane of the tire and reduces toward a position corresponding to the maximum width of the tire. Furthermore, the belt is fundamentally arranged along the carcass line or substantially in parallel to the base line.

In such carcass and belt shapes, the tension bearing ratio of the belt is increased near to the belt end at a time of filling an internal pressure and at a time of deformation under a load, so that the influence of strain-stress of rubber in the vicinity of the belt end considerably influences durability of the tire.

In this connection, U.S. Pat. No. 4,481,994 is concerned with a so-called controlled carcass line shifted from a natural equilibrium shape of the carcass line and discloses that the carcass line before filling of the internal pressure is arranged outside both the radial and axial directions of the tire between a position corresponding to the maximum width of the tire and a position in parallel to the belt as compared with the carcass line at the filling of internal pressure. Also the carcass line before filling of internal pressure is arranged outside the radial direction of the tire and inside the axial direction thereof between the position corresponding to the maximum width of the tire and bead core as compared with the carcass line at the filling of internal pressure. In the tire using such a controlled carcass line, however, the strain-stress at the belt end is slightly improved at the filling of internal pressure, but is still insufficient for improvement of the belt durability in a off-the-road heavy duty pneumatic radial tire which is the subject of this invention.

Because, the higher durability of the tire is required as the service conditions of the off-the-road tire, particularly input condition from uneven ground surface to tread with the advance of high speed running requirement become more severer, and consequently it becomes important to avoid the occurrence of peeling failure in the vicinity of the belt end. In order to prevent the occurrence of the peeling failure in the vicinity of the belt end, it is naturally required to sufficiently reduce minute motion generated at the belt end, i.e. stress produced by internal strain. Such an internal strain-stress is produced when the tire tread grows in the radial direction thereof at the filling of internal pressure.

On the other hand, the deformation strain-stress is produced by a loading applied to the tire tread during the running of the tire under a load and a force input to the tread through unevenness on irregular ground.

At the present time, it can be said that the total control of initial strain-stress and deformation strain-stress generated at the belt end under the severer service conditions as mentioned above is not still developed.

As to the reduction of the initial strain-stress and deformation strain-stress in the vicinity of the belt end, the inventors have previously attempted to render the belt of the tire into a concave form outward in the radial direction of the tire before the filling of internal pressure (hereinafter referred to as belt concave simply) to thereby obtain proper change quantity of each part of the belt after the filling of internal pressure. This is as reported in Japanese Patent laid open No. 61-157403, and consequently it has been found that the effect of improving the durability of the belt is developed as compared with the conventional tire but is insufficient under recent severer service conditions because there is a restriction on the effect.

SUMMARY OF THE INVENTION

It is, therefore, an object of the invention to provide off the-road heavy duty pneumatic radial tires which can attain the stability of tread shape and hence the stability of running performances and the improvement of the durability in the tire at the filling of internal pressure and during the running by properly controlling both the initial strain-stress and deformation strain-stress in the vicinity of the belt end on the basis of the above viewpoint on the carcass shape from the upper sidewall portion to the crown portion and the belt shape and at the same time have a high productivity.

As the basic idea of the invention, the inventors have noticed that the circumferential tension in the tread portion of the radial tire is born by the belt to hold the fundamental shape and performances of the radial tire and in this case, stress is produced by stretching or partly shrinking the belt layer in accordance with external force applied to the belt, i.e. a tensile force accompanied with the growth of outer diameter through the filling of internal pressure and a stress accompanied with the application of compressive force to the tread under loading. Further, the inventors have made various studies with respect to a relation among carcass shape for controlling initial strain-stress at the filling of internal pressure in the vicinity of the belt end and deformation strain-stress based on the running under a load, particularly a shape ranging from upper portion of the sidewall to central portion of the crown, belt shape and crown periphery.

As a result, the inventors have found a peculiar reinforcing means capable of cooperating the belt with such a new carcass line that tensile force required when being subjected to external force at the filling of internal pressure, the running under a load, riding on stones and the like is given to cords in the widthwise central portion of the belt and at the time the stretching in the vicinity of the belt end is reduced at maximum. A new carcass line is defined the tension bearing is large in the central portion of the belt and small in the end portion thereof, and the inventors confirmed that the tensile force in the vicinity of the belt end can be properly controlled even at the filling of internal pressure and the running under a load by the above reinforcing means to make strain-stress in the vicinity of the belt end small.

According to the invention, there is the provision of an off-the-road heavy duty pneumatic radial tire comprising a carcass ply of radial cord arrangement toroidally extending between a pair of beads as a tire casing reinforcement, and a belt superimposed about a crown portion of the carcass ply and composed of plural belt layers each containing steel cords or fiber cords having a modulus of elasticity equal thereto as a tread reinforcement, among which layers at least two main belt layers having an opposite inclination arrangement that cords of such adjoining layers are crossed with each other with respect to an equator of the tire, characterized in that in a section at a temporary self-posture when the tire is mounted onto a rim, a profile of the carcass ply is such a concave form that the profile line comes into contact with a straight line in parallel to a rotational axis of the tire at two points P sandwiching the equator of the tire and locates at a maximum separation distance h from the above straight line at the equator;

the main belt layers of the belt are arranged along the concave profile of the carcass ply between the above contact points P; and an outer profile of the tread is a straight line in parallel to the rotational axis of the tire or a slightly convex curve outward from the above straight line.

In the preferred embodiment of the invention, the distance of the carcass ply profile ranging between the two contact points P at the temporary self-posture is within a range of 0.3–0.55 times of the maximum width of the carcass, and the maximum separation distance h of the carcass ply profile is within a range of 0.0035–0.012 times of a height Hp as measured from a bead base to the contact point P.

BRIEF DESCRIPTION OF THE DRAWINGS

The invention will be described with reference to the accompanying drawings, wherein:

FIG. 1 is a skeleton view of the carcass line according to the invention;

FIG. 2 is a skeleton view of the carcass line and belt line according to the invention;

FIGS. 5A, 5B, 6A, 6B, 7A and 7B are graphs showing actions of tires, respectively;

FIGS. 8 and 9 are sectional views of the tires according to the invention, respectively; and FIGS. 10A and 10B are a sectional views of the general radial tire.

DESCRIPTION OF THE PREFERRED EMBODIMENTS

Figure 3:
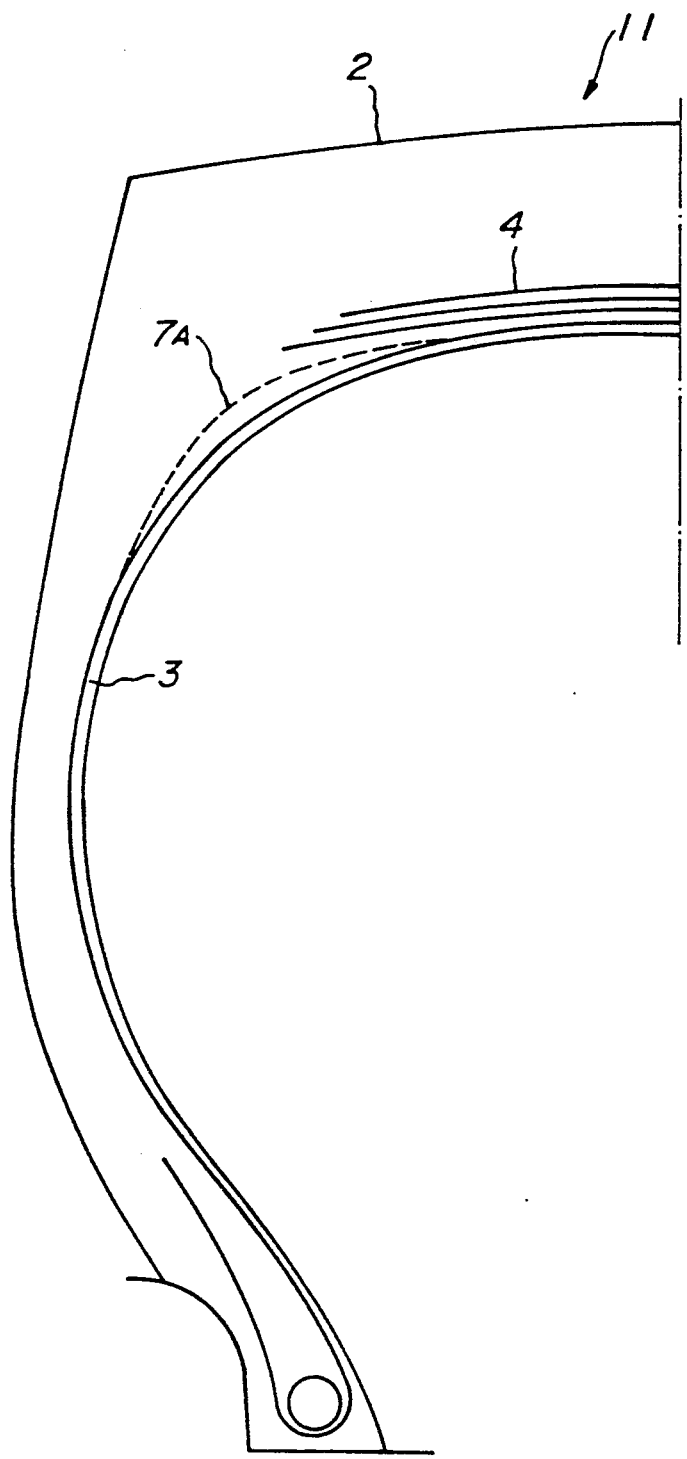
FIGS. 3 and 4 are sectional views of the conventional tires, respectively.

According to the invention, the carcass ply is formed by arranging many steel cords in parallel to each other and embedding them in a coating rubber and is incorporated into the tire so that these cords intersect at a substantially right angle with respect to the equator of the tire. That is, the cords of the carcass ply having a so-called radial arrangement. Furthermore, the term main belt layer in the belt means at least two belt layers among plural belt layers each containing rubberized steel cords or fiber cords having a modulus of elasticity equal thereto and having an opposite inclination arrangement that cords of such adjoining layers are crossed with each other with respect to an equator of the tire and inclined at a relatively small angle of, for example, 15°–30° with respect to the equator. If the moduli of elasticity in the cords among the belt layers are different, a belt layer of cords having smallest modulus of elasticity is excluded from the main belt layer. In any case, the main belt layers exclusively bear the circumferential tension on the tire tread.

In general, the cord is constructed by twisting steel wires or organic or inorganic fibers, so that the unit of ordinary elasticity is not used as a modulus of elasticity in the cord. Therefore, the modulus of elasticity according to the invention is represented by an elongation (%) at a load corresponding to 10% of fracture load of the cord. That is, cords in which the elongation at a load corresponding to 10% of fracture load is not more than 0.3% are used as a cord for the main belt layer according to the invention.

In FIGS. 1 and 2 are schematically shown profiles of tire section illustrating carcass shape and belt shape of the tire according to the invention at a temporary self-posture of mounting the tire onto a rim or at a state of filling an internal pressure corresponding to 10% of normal internal pressure, respectively. FIG. 1 shows a basic shape of a carcass line $22_A$ in a carcass ply at a radial section of a radial tire 21, while FIG. 2 shows a basic shape of belt line $23_A$ as a neutral line of each of main belt layers in a belt 23 (three main belt layers in the illustrated embodiment) in addition to the base shape of the carcass line shown in FIG. 1.

The carcass line $22_A$ is rendered into a smoothly concave form such that the caving of the carcass line starts from a point P corresponding to a distance B separated from the equator E of the tire and is maximum at an intersect C with the equator E. As shown in FIG. 2, each belt line $23_A$ of the belt 23 is arranged in a concave form along the concave region Of the carcass line $22_A$ from the intersect C to the point P outside a crown portion $22a$ of the carcass line $22_A$ in the radial direction. Incidentally, the crown portion of the conventional carcass line $22_A$ inclusive of Japanese Patent laid open No. 61-157403 is shown by a broken line 7 in FIG. 1.

In general, the belt develops its function by bearing the circumferential tension of the tire, but when the function of bearing a large tension is given to the vicinity of the belt end, the peeling failure at the belt end is promoted due to strain-stress in the vicinity of the belt end.

In this connection, the inventors have found that the quantity of peeling crack generated in the vicinity of the belt end is proportional to stress generated from strain near to the belt end and hence the durability is improved by controlling stress value in the vicinity of the belt end.

As disclosed in U.S. Pat. No. 4,481,994, there is proposed a method of scooping out the carcass line $7_A$ at each end portion of the tread as shown by a broken line in FIG. 3. In this method, however, the strainstress in the vicinity of the belt end is somewhat mitigated in the inflation under an internal pressure, but is still insufficient. Moreover, the carcass ply approaches the vicinity of the belt end and interferes therewith to inversely increase the strainstress in the vicinity of the belt end during the running under a load, resulting in the promotion of the peeling crack failure in the vicinity of the belt end when being run on irregular ground under a heavy load.

Figure 4:
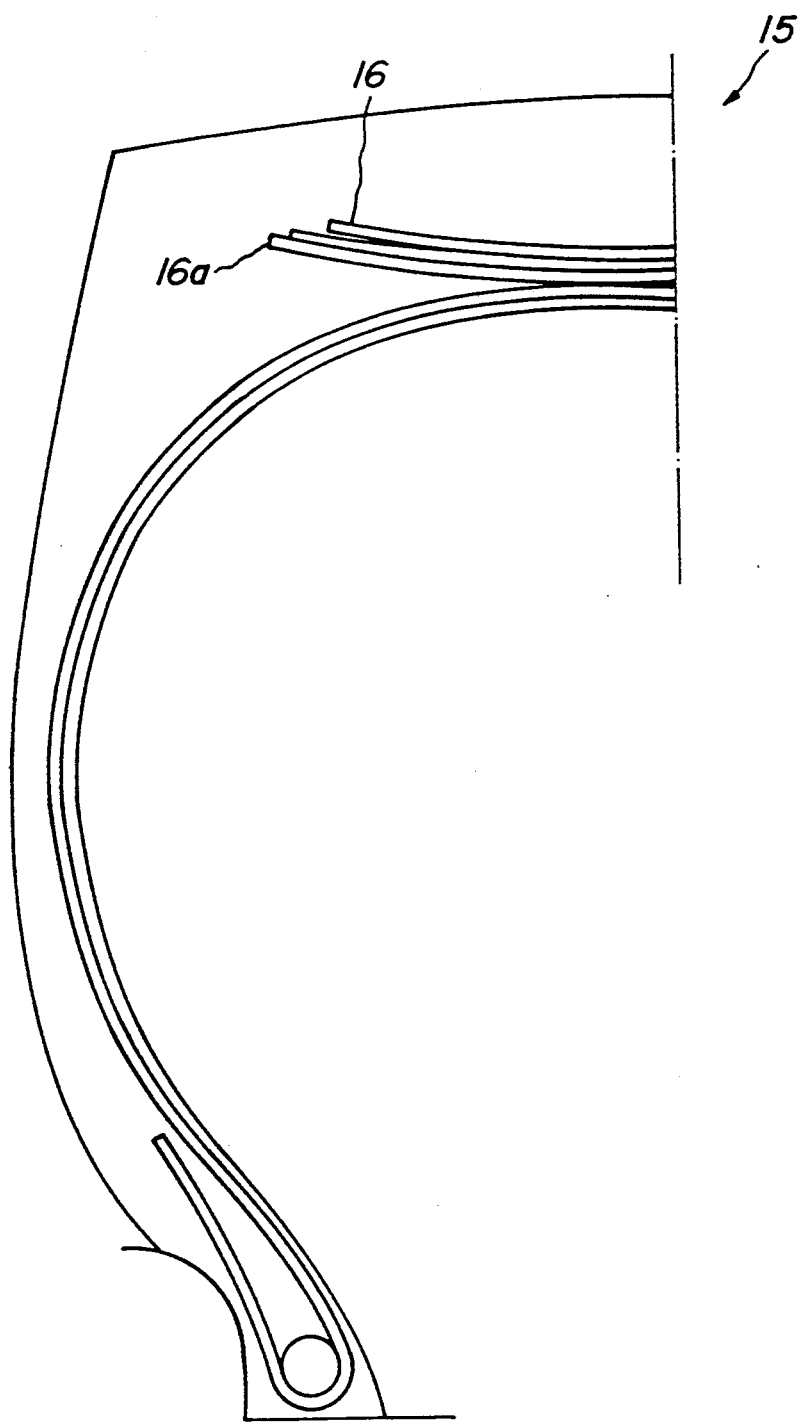

On the other hand, in the belt structure of Japanese Patent laid open No. 61-157403 as shown in FIG. 4, the strain-stress in the vicinity of the belt end largely reduces at the filling of internal pressure and at the running under a load, whereby the peeling crack failure can be somewhat mitigated in the vicinity of end $16a$ of the belt 16 but is not yet sufficient. Therefore, in order to mitigate the above failure, the belt 16 should be largely caved outward in the radial direction of the tire, i.e. the curvature of the belt 16 should be made large. In the latter case, the end portion $16a$ of the belt 16 approaches to the bottom face of the groove, or the deformation strain-stress due to external force applied to the tread in the contacting with ground is largely applied to the belt end portion, whereby the mitigation of the peeling at the belt end is injured.

As previously mentioned on FIGS. 1 and 2, when the shape of the carcass line $22_A$ at the crown portion thereof $22a$ is concave in the region B and also the shape of the belt 23 is concave along the carcass line $22_A$ at the region B, the strain-stress in the vicinity of the belt end is suppressed at maximum not only when filled to internal pressure but also during the running under a load, which is most effective for preventing the peeling crack at the belt end.

That is, when the carcass line $22_A$ and the belt line $23_A$ are rendered into a concave form at the crown region, tension larger than the conventional one and capable of controlling the tread form can positively be applied to a central portion $23a$ of the belt 23, while the strain-stress in the vicinity of the belt end $23b$ largely reduces. Moreover, the term "vicinity of belt end $23b$" used herein means a region ranging from the belt end to not more than 25% of a half of maximum width of the belt.

Moreover, it has been found that the peeling crack failure in the vicinity of the belt end $23b$ is determined not only by the strain-stress but also by the strain-tension at the whole region.

The above improving effect is clear from FIGS. 5 to 7 showing stress distributions at belt end portions in the tire 21 according to the invention and the conventional tires 15 and 11 having the same size at the filling of internal pressure and at the running under a load as mentioned later. FIG. 5 shows a stress distribution based on the invention, which is results from the durability test on a drum causing the peeling crack at the belt end.

When the tire according to the invention is run on an irregularly rough road, even if it is subjected to cut damage through scattered stones, there can be removed an avoidable drawback in the belt structure having a concave form outward in the radial direction of the tire based on the disclosure of Japanese Patent laid open No. 61-157403 as previously mentioned on FIG. 4, i.e. a problem that when cut damage is caused in the vicinity of the belt end, it is apt to easily arrive at the vicinity of the carcass ply.

In the invention, the outer profile of the tread at the self-posture of mounting the tire onto the rim is a straight line in parallel to the rotational axis of the tire or a slightly outward convex curved line, which is substantially the same as the tread periphery in the mold conventionally used in the building and curing of this type of the tire.

Thus, the radius of curvature in the outer profile of the tread after the filling of normal internal pressure in the tire, which largely exerts on heat build-up of the tire during the running, wearing, distribution of strain-stress inside tread and the like, can be included within a given acceptable range.

On the other hand, assuming that the outer profile of the tread is set to a concave form even when the carcass line and belt line of the main belt layers are rendered at their crown portion into concave form as mentioned above, in case of off-the-road heavy duty pneumatic radial tires having a large tire size and requiring a fairly large thickness of tread portion as compared with tires for truck and bus a, very complicated calculation and design are required for putting the radius of curvature in the tread within the acceptable range. Also, even when tires are manufactured in a mold designed by the obtained calculation results, the objective tread form is not always obtained. Therefore, trial and error are repeated for the obtention of the objective tread form, so that a great number of days and steps and large cost are required, resulting in the conspicuous reduction of the productivity.

Further, it has been confirmed that even when the objective tread form is obtained, the tread form is largely scattered every tire by load hysteresis and heat hysteresis during the running.

If it is intended to adopt the belt structure different from the initially designed one, a mold should be newly manufactured. As a result, one mold per one belt structure is required, resulting in the reduction of the productivity.

Moreover, the concave form remains in the outer profile of the tread after the filling of normal internal pressure in the tire, the ground contact pressure at each side end of the tread becomes higher, and consequently the temperature in the vicinity of the belt end at each side end of the tread becomes higher. This promotes thermal degradation and increases the strain-stress in the vicinity of the belt end. As a result, it is clear that the object of the invention can not be achieved.

Inversely, when the outer profile of the tread is convex and the curvature thereof becomes large, the heat build-up at the central portion of the tread is promoted to accelerate the thermal degradation of the tread central portion and finally cause thermal breakage. At the same time, the displacement in the radial direction of the tire becomes excessive in the vicinity of the belt end during the ground contacting of the tread and hence excessive tension is applied to the vicinity of the belt end, whereby the expected reduction of strain-stress is injured and the object of the invention is not achieved.

Similarly, the same result is obtained when the outer profile of the tread is not smooth and has an inflection point.

According to the invention, tires having stable performance and good durability are provided at a high productivity while preventing the occurrence of the aforementioned various accidents without causing disadvantages in the designing for the building and curing mold.

Of course, the outer profile of tread corresponding to the shaping face in the cavity of the mold viewed from the inside of the tire can be formed so that the convex form of central portion and both side end portions in the tread is formed by the same radius of curvature or in a convex composite curve smoothly connecting the radius of curvature at the central portion to a radius of curvature at each side end portion different from the radius of curvature at the central portion.

The term "temporary self-posture" used herein means a state of filling an internal pressure corresponding to 10% of normal internal pressure after the tire is mounted onto a rim.

In the heavy duty pneumatic radial tire according to the invention, the carcass line has two inflection points P at both sides of the equator and is rendered into a concave form between these two points outward in the radial direction, while the main belt layers of the belt are arranged along the concave carcass line at the crown portion thereof in a concave form outward in the radial direction, so that when external force is applied to the tire by inflating under an internal pressure or running under a load or further riding on stones, the initial strain-stress and deformation strain-stress in the vicinity of the belt end largely reduce together. As a result, the occurrence of peeling crack failure as well as cut failure through stones or the like are largely reduced over substantially the entire running period inclusive of the initial running, whereby the durability of the tire is largely improved. Furthermore, the outer profile of the tread is convex or straight line parallel to the rotational axis of the tire, so that the stabilized running performances and durability are obtained over a whole running period. Also, the conventional curing mold can be used, so that the tire productivity is largely increased.

Moreover, the reason why the distance B between the point P and the point C is within a range of 0.3–0.55 times of a half W of maximum width of the carcass line is due to the fact that when the distance B exceeds 0.55 times, the tension bearing ratio at the central portion of the tread becomes excessive, and consequently the tread form becomes unstable at the initial stage after the filling of internal pressure. Also uncontrollable creeping is caused in the belt layers during the running to unstabilize the tread form and it is difficult to obtain expected performances and durability. The distance B is preferably within a range of 0.32–0.47 times of W.

When the concave quantity h is within a range of 0.0035–0.012 times of the height $H_P$, the effect aiming at the invention is particularly advantageously developed. The concave quantity h is preferably within a range of 0.005–0.009 times of $H_P$.

FIG. 8 is a first embodiment of the off-the-road heavy duty pneumatic radial tire according to the invention having a tire size of 18.00 R33 for use in construction vehicle. The tire 21 comprises a pair of ring-like bead cores 25, at least one carcass ply 22 extending between these bead cores 25 and composed of rubberized cords arranged at an angle of approximately 90° with respect to the circumferential direction of the tire, and a belt 23 superimposed about a crown portion 22a of the carcass ply 22 outward in the radial direction and composed of plural belt layers each containing rubberized steel cords.

The belt 23 comprises two main belt layers $23_M$, cords of which layers being crossed with each other, and an auxiliary belt layer $23_N$ piled outside the main belt layers $23_M$, wherein these layers are a first layer $23_{M1}$, a second layer $23_{M2}$ and a third layer $23_{N3}$ viewing from the side of the carcass ply 22.

The carcass ply 22 contains steel cords each having a structure of $(1\times3+9+15)\times0.23+1$.

The steel cord used in the belt 23 uses as, the first and second layers $23_{M1}$ and $23_{M2}$ a structure of $(7\times7)\times0.25+1$, and the third layer $23_{N3}$ is a high elongation Cord of $(3\times7)\times0.23+1$.

The cord direction in the first layer is upward to the right viewing from the outside of the tire and the cord angle with respect to the equator is 20° (hereinafter simply shown by R20°). Similarly, the cord direction in the second layer $23_{M2}$ is upward to the left and the cord angle is 20° (hereinafter simply shown by L20°).

The auxiliary belt layer $23_N$ is R20°.

Numeral 26 is a tread, which covers the outside of the belt 23.

Numeral 27 is a sidewall, which covers a side portion of the carcass ply 22.

In FIG. 8 is shown a temporary self-posture of the heavy duty pneumatic radial tire 21 when it is mounted onto a normal rim 29 and inflated under an internal pressure corresponding to 10% of normal internal pressure. Numeral 30 is a base line, which is a straight line passing through a bead heel 25a at a position equal to a nominal diameter of the rim for this tire 21 and in parallel to the rotational axis of the tire.

Figure 9:
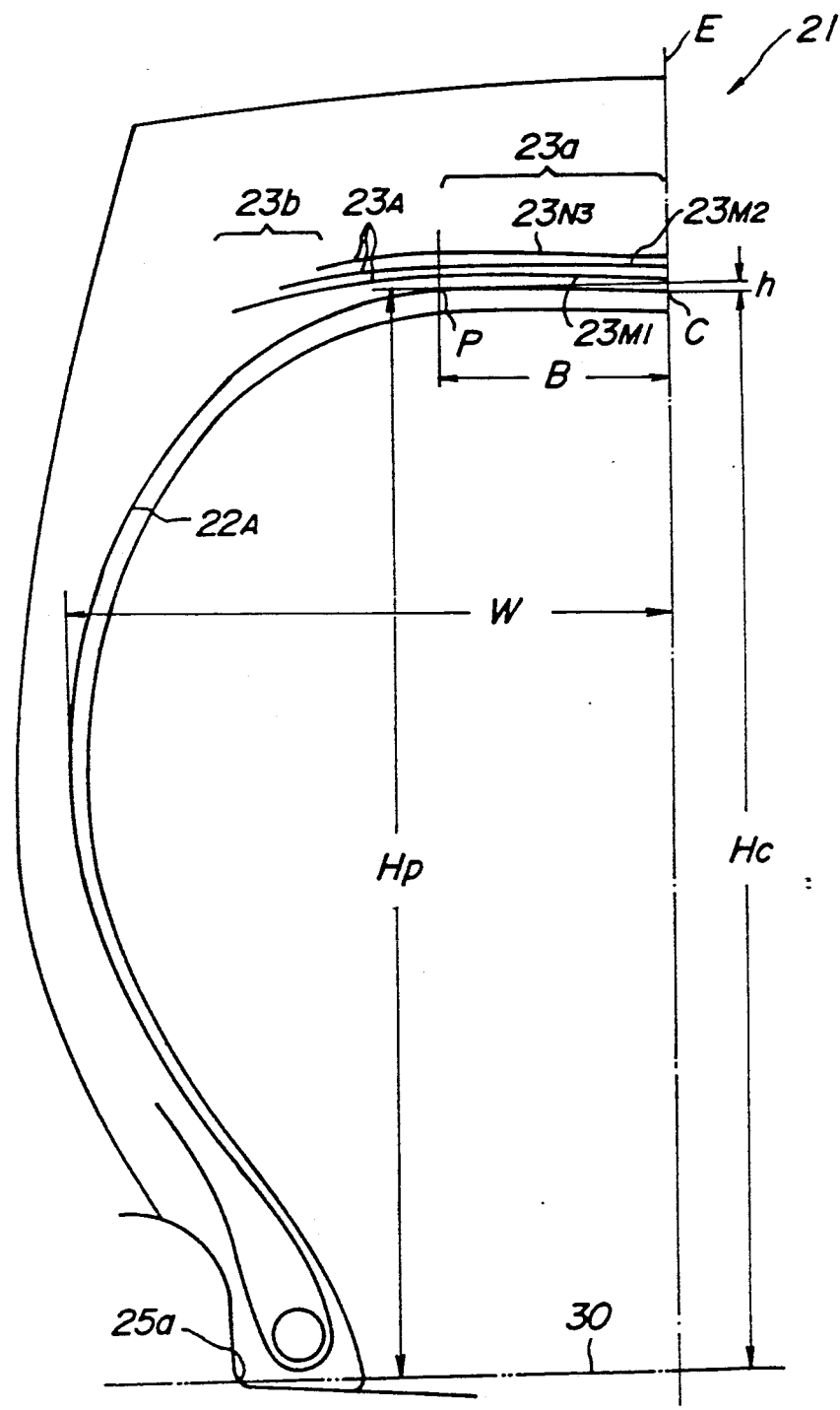

FIG. 9 shows carcass line $22_A$ and belt line $23_A$ of the heavy duty pneumatic radial tire 21 shown in FIG. 8. The carcass line $22_A$ comes into contact with a straight line in parallel to the rotational axis of the tire at a point P located at a maximum distance from the base line 30 in the radial direction. This contact point P exists at both sides with respect to the equator E of the tire in the rotational axis direction thereof. The carcass line $22_A$ forms a gently concave curve from the contact point P to the equator E in the radial direction. The height $H_P$ from the base line 30 to the contact point P (416.6 mm) is higher by a concave quantity h (2.5 mm) than a central height Hc from the base line 30 to an intersect C between the carcass line $22_A$ and the equator E. The distance B in axial direction between the contact point P and the equator E is 0.40 times of a half W of the maximum width of the carcass line $22_A$ (67 mm). Further the concave quantity h is 0.006 times of the contact height $H_p$.

The belt line $23_A$ of the main belt layers $23_M$ is arranged in a concave form outward in the radial direction along the carcass line $22_A$ of the carcass ply 22 over a region ranging from the equator E to the contact point P.

The outer profile 26a of the tread 26 in the tire 21 is convex outward in the radial direction as shown in FIG. 8, but may be flat. In the aforementioned temporary self-posture, the outer profile 26a of the tread 26 has a curvature substantially similar to that of a tread corresponding portion of a usual mold cavity for curing the heavy duty pneumatic radial tire 21. Therefore, the usual mold can be used in the vulcanization of the tire according to the invention without using plural molds of special complicated shapes, resulting in the large improvement of tire productivity.

When the tire 21 is inflated under normal internal pressure, the height $H_P$ of the point P separated from the equator E by the distance B is 418.6 mm, and as a result the concave quantity h is −1.2 mm. That is, the concave form of the carcass line is turned into a convex form, whereby the size of the carcass line is enlarged by 3.7 mm at the crown center and by about 2 mm near to the point P to give a proper tension distribution to the belt. Thus, optimum and large tension is given to the central portion of the crown in the main belt layers $23_M$, while the tension is largely reduced in the vicinity of the belt end portion 23b. Consequently the strain-stress in the vicinity of the belt end 23b is reduced to largely suppress the occurrence of the peeling failure.

The effect of the invention will be described below by using three test tires (Example, Comparative Examples 1 and 2).

Figure 7A:
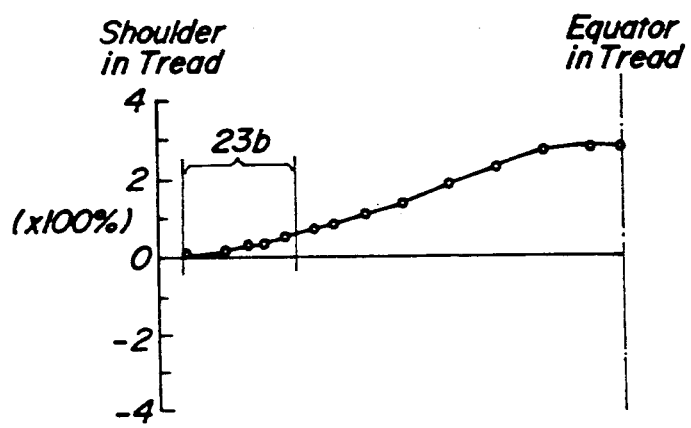
Figure 7B:
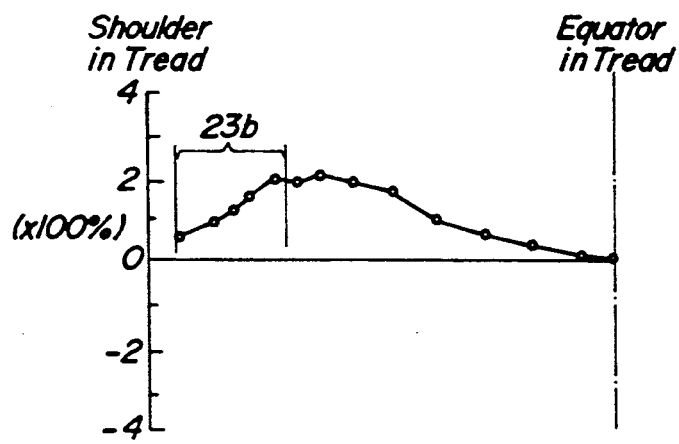

As the test tire, there were provided a first tire corresponding to the tire shown in FIG. 8 (Example), a second tire corresponding to the conventional tire shown in FIG. 10, and a third tire corresponding to the tire of FIG. 4 based on the description of Japanese Patent laid open No. 61-157403, which tires had a tire size of 18.00 R33. Moreover, the belt cord and carcass ply cord in the second and third tires were the same as in the first tire. At first, the calculation results from experiments on strain-stress in the half width of the belt layer are shown in FIGS. 5a, 5b, 6a, 6b, 7a and 7b, respectively. FIGS. 5a and 5b show the results of the first tire in Example according to the invention. FIGS. 6a and 6b show the results of the second tire in the conventional example of FIG. 10. FIGS. 7a and 7b show the results of the third tire of FIG. 4 as disclosed in Japanese Patent laid open No. 61-157403, wherein FIGS. 5a, 6a and 7a are graphs showing circumferential stress applied to a half of widest belt width at the filling of internal pressure in these test tires. FIGS. 5b, 6b and 7b are graphs showing circumferential stress applied to a half of widest belt width at the running under a load in these test tires, respectively. In FIGS. 5a, 5b, 6a, 6b, 7a and 7b, when the circumferential stress of the belt layer is 0 as a standard, an upper side of the ordinate shows a percentage of tensile stress (kgf/mm) and a lower side thereof shows a percentage of compressive stress (kgf/mm). The abscissa shows a position of the belt layer in widthwise direction when the equator of the tread is standard.

In these graphs, the stress over a half width of the belt layer is plotted, and particularly the region 23b in the vicinity of the belt end, which is most important in the invention, is clearly shown in these figures. Moreover, the region 23b is 25% of a half of widest width among the belt layers in the belt.

The experiment and calculation for measuring the numerical values will be described below.

At first, the modulus of elasticity and the like of materials used in the test tires are measured to specify the constant of the material, from which FEM calculation is carried out. Then, various values are measured after the tire is manufactured, mounted onto a normal rim, inflated under normal internal pressure and subjected to normal loading, which are checked with the above calculation results.

The above results are shown in FIGS. 5a to 7b.

The effect of the invention can be proved from these graphs. That is, in the first tire according to the invention, the tensile stress at the region 23b in the vicinity of the belt end is considerably lower than those of the comparative examples not only at the filling of internal pressure but also at the running under a load. Particularly, the reduction of stress at running under a load is conspicuous. Furthermore, the tensile stress at the central portion of the belt layer is large as expected and proper. Moreover, the stress of the belt layer in the tire of Japanese Patent laid open No. 61-157403 as a comparative example is improved as compared with the case of the conventional tire, but the improving degree is not fairly extended to the case of the invention.

Next, the durability test was made with respect to the above three test tires to obtain the following results. The test was carried out by using an indoor drum testing machine under usual durability test conditions where the test tire was mounted onto a normal rim, inflated under normal internal pressure and then run at a speed of 20 km/h. In this case, the tire was first run under a load corresponding to 80% of normal load for eliminating the extra residual stress, and the load was turned to normal load and thereafter the . running was continued by stepwise increasing the load at a rate of 10% of normal load. Moreover, the peeling crack failure at the belt end portion was evaluated by "swelling" in the vicinity of the tread end, which can clearly be distinguished from the exterior, as a standard. The results of the durability test were represented by a ratio (%) of load generating the failure to normal load and a running distance until the occurrence of the failure as shown in the following Table 1. Moreover, the running distance was represented by a percentage on the basis that Comparative Example was 100, wherein the larger the numerical value, the better the property.

TABLE 1

| | Kind of tire | | |
| --- | --- | --- | --- |
| Evaluation term | Example | Comparative Example 1 | Comparative Example 2 |
| Load ratio at failure (%) | 200 | 160 | 180 |
| Running distance till occurrence of failure (%) | 184 | 100 | 159 |

As seen from Table 1, the durability of the tire according to the invention is largely improved.

As mentioned above, according to the invention, both the initial strain-stress and deformation strainstress in the vicinity of the belt end generated at the belt for reinforcing the tread of the tire can properly be controlled. Further the use of special mold is not required, so that the belt durability in the tire is improved and the tire performances are stabilized and the tire productivity is largely improved.

What is claimed is:

1. An off-the-road heavy duty pneumatic radial tire comprising; a carcass ply of radial cord arrangement toroidally extending between a pair of beads as a tire casing reinforcement, a belt superimposed about a crown portion of the carcass ply and composed of plural belt layers each containing cords as a tread reinforcement, said belt layers including at least two main belt layers having an opposite inclination arrangement wherein cords of said adjoining main belt are crossed with each other with respect to an equator of the tire, wherein in a tire section at a temporary self-posture when the tire is mounted onto a rim and inflated to 10% of normal internal pressure, a profile of the carcass play is a concave form so that said profile comes into contact with a straight line in parallel to a rotational axis of the tire at two points P spaced on opposite sides from the equator of the tire and is located at a maximum separation distance h from said straight line at the equator.

the main belt layers of the belt are superimposed about and arranged along the concave profile of the carcass ply between said two points P and separated away from the concave profile at both ends extending over said points P from said carcass ply;

a distance between said two points P in said carcass profile at said temporary self-posture is within a range of 0.3–0.55 times of a maximum width of said carcass, and a maximum distance of said carcass profile separated from a line connecting said points P to each other is with a range of 0.0035–0.012 times of a height as measured from a bead base to said point P; and an outer profile of the tread is a straight line in parallel to the rotational axis of the tire or a slightly convex curve outward from said straight line at said temporary self-posture.

2. The off-the-road heavy duty pneumatic radial tire according to claim 1, wherein cords of said main belt layer comprise steel, said cords have an inclination angle of 15°–30° with respect to the equator of the tire, and said cords have an elongation at a load corresponding to 10% of fracture load of not more than 0.3%.

3. The off-the-road heavy duty pneumatic radial tire according to claim 1, wherein cords of said belt layers comprise fiber cords.

* * * * *